(12) United States Patent
Sprunk (10) Patent No.: US 7,486,792 B2
(45) Date of Patent: Feb. 3, 2009

(54) TERRESTRIAL BROADCAST COPY PROTECTION SYSTEM FOR DIGITAL TELEVISION

(75) Inventor: Eric J. Sprunk, Carlsbad, CA (US)

(73) Assignee: General Instrument Corporation, Horsham, PA (US)

( * ) Notice: Subject to any disclaimer, the term of this patent is extended or adjusted under 35 U.S.C. 154(b) by 564 days.

(21) Appl. No.: 10/646,398

(22) Filed: Aug. 21, 2003

(65) Prior Publication Data

US 2004/0052380 A1    Mar. 18, 2004

Related U.S. Application Data

(60) Provisional application No. 60/405,454, filed on Aug. 23, 2002.

(51) Int. Cl.
*H04N 7/167* (2006.01)
*H04L 9/00* (2006.01)

(52) U.S. Cl. .......................... 380/228; 380/281; 380/43

(58) Field of Classification Search ......... 380/210–220, 380/228, 281, 43
See application file for complete search history.

(56) References Cited

U.S. PATENT DOCUMENTS

| | | | |
|---|---|---|---|
| 5,341,425 A * | 8/1994 | Wasilewski et al. | 380/212 |
| 5,703,950 A * | 12/1997 | Jovanovich et al. | 380/249 |
| 5,819,036 A | 10/1998 | Adams et al. | |
| 5,896,454 A | 4/1999 | Cookson et al. | |
| 5,999,623 A * | 12/1999 | Bowman et al. | 380/239 |
| 6,124,878 A | 9/2000 | Adams et al. | |
| 6,473,858 B1 * | 10/2002 | Shimomura et al. | 713/150 |
| 6,851,049 B1 * | 2/2005 | Price, III | 713/150 |
| 6,910,136 B1 * | 6/2005 | Wasserman et al. | 726/4 |

(Continued)

FOREIGN PATENT DOCUMENTS

EP       0 679 029 A1    10/1995

(Continued)

OTHER PUBLICATIONS

Eskicioglu, Ahmet M. et al; *An Overview of Multimedia Content Protection in Consumer Electronics Devices*; Signal Processing: Image Communication; 2001; pp. 681-699; vol. 16; Elsevier Science B.V.

(Continued)

*Primary Examiner*—Nasser G Moazzami
*Assistant Examiner*—Mohammad W Reza
(74) *Attorney, Agent, or Firm*—Larry T. Cullen (57) ABSTRACT

According to the invention, a method for protecting digital television from unauthorized digital receivers within a population of digital receivers is disclosed. Each digital receiver in the population has a unique identifier. In one step, provisioning information is received from a subset of the population of digital receivers indicating that the subset is potentially within range to receive digital television from a broadcaster. First decryption information is distributed to the subset of the population of digital receivers. The first decryption information allows for potentially decrypting a plurality of programs coextensively in time. The unauthorized digital receivers are cryptographically excluded from using the first decryption information. A first program is encrypted using a first method that is cryptographically related to second decryption information. The first program is sent. The second decryption information is distributed and cryptographically secured with the first decryption information.

15 Claims, 11 Drawing Sheets

U.S. PATENT DOCUMENTS

2002/0021809 A1  2/2002  Sato et al.
2002/0090090 A1* 7/2002  Van Rijnsoever et al. ... 380/279
2002/0133707 A1* 9/2002  Newcombe ................. 713/183

FOREIGN PATENT DOCUMENTS

WO    WO 01/52543 A1   7/2001

OTHER PUBLICATIONS

Yang, Xiao-Wen et al., *Key Distribution System for Digital Video Signal*, Proceedings of ICSP, 1996, pp. 847-850.

Antonette Goroch, *DTV Chien-and-Egg*, Broadband Week, Aug. 6, 2001, 2 pages, Cahners Business Information, downloaded from http://www.broadbandweek.com on May 8, 2003.

*Digital Transmission Content Protection Specification*, Digital Transmission Content Protection Specification (informational Version), Feb. 25, 2002, pp. 1-67, Revision 1.2a, 5C, USA.

*DTCP vol. 1 Supplement A Mapping DTCP to USB (Informational Version)*, Feb. 25, 2002, pp. 1-8, Revision 1.2a, 5C, USA.

Bill Pearson, *Digital Transmission Content Protection*, Jun. 16, 1999, pp. 1-25, Intel Corporation, USA.

\* cited by examiner

TERRESTRIAL BROADCAST COPY PROTECTION SYSTEM FOR DIGITAL TELEVISION

This application claims the benefit of and is non-provisional of U.S. Provisional Application Ser. No. 60/405,454 filed on Aug. 23, 2002, which is incorporated by reference in its entirety.

BACKGROUND OF THE INVENTION

This invention relates in general to copy protection and, more specifically, to copy protection of terrestrial broadcast digital television.

Copy protection and digital rights management (DRM) are used to protect content from use not licensed by the copyright holder. There are various levels of protection which include copy freely, copy once, copy never, etc. Protection of movies and music on the Internet has been performed with DRM. In some cases, software is also protected with DRM.

Digital television (DTV) is broadcast in many designated marketing areas (DMA). One popular type of DTV is high-definition television (HDTV). Some televisions include DTV tuners, while others rely on external tuners. Anyone with a tuner can receive and view the broadcast programs. These broadcasts are transmitted in the clear, but may include a flag that indicates the program should not be copied. The flag is also in the clear, but is intended to secure the program. A properly-functioning DTV tuning device recognizes the flag and prevents copying to the extent possible. Those skilled in the art can appreciate that the flag could easily be replaced by a content pirate to make the program unsecured. Conventional DTV is referred to as unprotected DTV in this application. Further, many other techniques can be used to pirate or steal the broadcast programs.

In the United States alone there are hundreds of millions of TV sets that may move to various geographic locations during their lifetime. Today, most of these TVs are analog, but the trend is toward use of TVs and external tuners that can receive unprotected DTV. A given broadcaster in a particular DMA only needs to worry about those TVs that can receive the signal, but the owners can move from one DMA to another DMA along with his or her TV.

BRIEF DESCRIPTION OF THE DRAWINGS

The present invention is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE PREFERRED EMBODIMENT

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

Figure 1A:
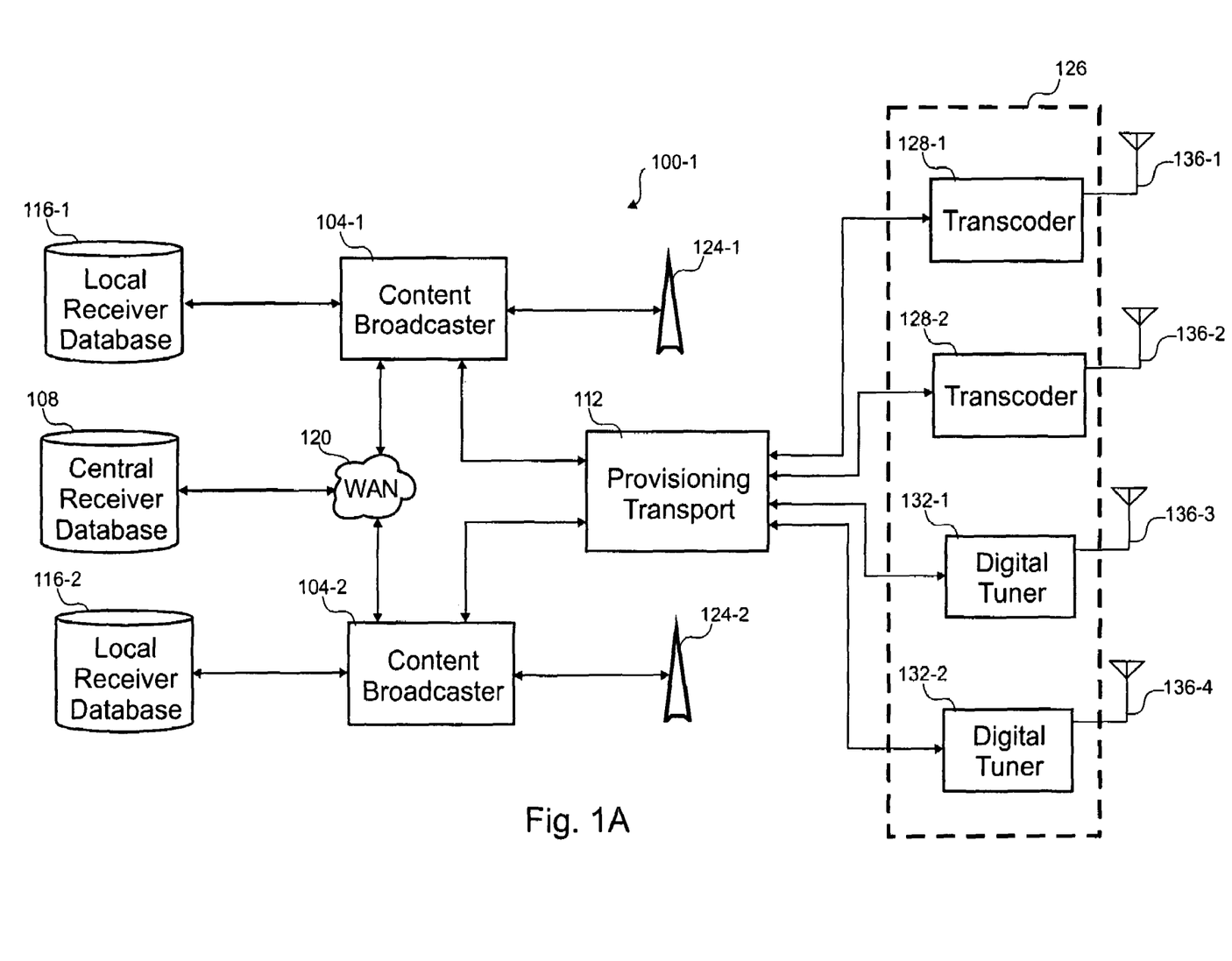
FIG. 1A is a block diagram of an embodiment of a terrestrial broadcast system.

Referring initially to FIG. 1A, a block diagram of an embodiment of a terrestrial broadcast system 100-1 is shown that distributes protected DTV. This embodiment shows only two content broadcasters 104 and four digital receivers, but it is to be understood that other embodiments could have tens of content broadcasters 104 and hundreds of thousands of digital receivers 126 or more. For example, a city having a population of a million could expect twenty content broadcasters 104 and a million digital receivers.

Content broadcasters 104 transmit programming by way of terrestrial antennas 124 in digital format. Digital receivers 126 at the user locations each receive this signal with an antenna 136 and decode it for presenting on a television or other display. In this embodiment, each content broadcaster 104 can provision digital receivers 126 to be able to decode the content broadcast. In this embodiment, all digital receivers 126 that can receive the signal from the broadcaster 104 is allowed to decode that signal unless permission has been revoked. The content broadcaster in this embodiment maintains a local receiver database 116 of digital receivers 126 allowed to decode the content. Cryptographic techniques are used in this embodiment to prevent revoked receivers 126 from viewing the content.

This embodiment uses both local and central receiver databases 116, 108 to track provisioned receivers 126. The local database 116 lists the receivers 126 allowed to receive the next revocation management message (RMM). An RMM is very similar to an Entitlement Management Message (EMM), which delivers authorization data and associated keys. Though an RMM delivers this same information, its purpose also includes the delivery of revocation information if required. Thus one important purpose is deauthorization, rather than authorization, and its name reflects this. Each provisioned receiver 126 communicates a unique serial number, a unit key and a certificate for storage in the local receiver database 116. The unique serial number is used to track the digital receiver 126. The certificate is recursively generated to authenticate the receiver 126 back to a root authority. For example, the unique serial number for the unit could be encrypted by a chain of trust such that checking of the certificate assures the receiver 126 is authentic.

The unit key is used to individually encrypt the RMM sent to each of the provisioned receivers 126. The RMM has an expiration date and a category key used to decrypt revocation control messages (RCM). Each program or channel includes a RCM that has a content key to decrypt the program or channel. Some embodiments have a RCM for each program and others have a RCM for each channel. Only the digital receivers 126 that have a current RMM to decrypt the RCM can get the content key. De-provisioning or revocation occurs when the RMM changes and certain receivers 126 do not receive the new category key. It should be noted that there could be a number of category keys, where one or more content broadcasters share a particular category key. In this embodiment, the unit key is unique and distinct to a single receiver and is a public key using an asymmetric algorithm, such as RSA. The category and content keys are private keys using a symmetric algorithm, such as 128-bit AES, but other embodiments could use different algorithms and key lengths.

The central receiver database 108 has information gathered from a number of local receiver databases 116. Entries in the local and central receiver databases 116, 108 are reconciled by the content broadcaster 104 through a wide area network (WAN) 120. Once a receiver 126 is provisioned, the central receiver database 108 is informed and the data on the receiver 126 is forwarded. This information can be forwarded to other content broadcasters 104-2 in the designated marketing area (DMA) of the first content broadcaster 104-1 who originally received the provisioning. Content providers 104 in neighboring DMAs that overlap the first DMA would also be informed. All of their local databases 116 would be updated and RMMs would be sent.

Whenever a digital receiver 126 moved from a DMA, the local receiver databases 116 would be updated to remove the relevant entry. Some embodiments have two-way communication with the digital receivers 126 such that polling could be performed to determine when a digital receiver 126 had moved or gone out of service. In systems where the communication is one-way and the receiver 126 cannot automatically send information to the content broadcasters 104, the moved receivers 126 could be determined by querying the central receiver database 108 to find units that have provisioned at another DMA. For digital receivers 126 that are mobile, such as those in autos, they could be provisioned nationwide by making a note in the central receiver database 108 and propagating the entry to all local receiver databases 116. Alternatively, the user could provision once in each DMA.

The provisioning transport 112 provides a mechanism for new digital receivers 126 to be provisioned. This could be performed at the store that sold the digital receiver or at the user location. Some embodiments could provide temporary keys to allow viewing some terrestrial content before provisioning is required when the RMM key expires. Two-way communication between the digital receiver 126 and content broadcaster enables provisioning in an automated and/or manual fashion.

There are many possibilities for doing receiver 126 provisioning. In one embodiment, the store clerk performs the provisioning before the customer leaves the store. Address information from the user could be used to determine the relevant DMA for that address. The unique identifier, unit key and certificate could be communicated by an electronic connection, for example, a network connection. In some embodiments, only a unique identifier is communicated and the content broadcaster 104 queries a database for the receiver's unit key. The unit key could also serve as the unique identifier to reduce the information needed, though its secure handling might necessitate significant protections.

Another possibility is to use an electronic connection to the content broadcaster 104 as the provisioning transport 112 to communicate information on the digital receiver 126. This connection could be through a cable modem, DSL modem, Ethernet, wireless networking, cellular phone network, phone modem, satellite link, or other datalink. A port on the digital receiver 126 could be connected through a network to allow providing provisioning information to the content broadcaster. This connection could be only during provisioning or a persistent connection to allow polling, RMM and RCM delivery, etc. The retailer could perform the connection at the retail location before the user took home the receiver 126.

In another embodiment, the content broadcaster 104 has a list of the unit keys for all or most digital receivers 126. The list may be in the central receiver database 108, for example. The user could telephone in, e-mail or mail his or her unique serial number for the digital receiver 126. The unique serial number would be used to retrieve the unit key for the digital receiver 126 for storage in the local receiver database 116. Alternatively, the user could in some embodiments read-off the characters that make up the unit key which could serve as the unique serial number also or that could also be read-off to a customer representative on the telephone if that proves practical.

This embodiment has digital receivers 126 that fall into two general categories, namely, transcoders 128 and digital tuners 132. The transcoder 128 takes the protected DTV signal, unscrambles it and recodes it for a format compatible to the display device. In many cases, the recoded format is a baseband signal, a NTSC signal, or an unprotected DTV signal. For example, the transcoder 128 could receive the protected DTV signal, unscramble it, and output it remodulated as an unprotected DTV signal. The tuner in the display decodes and presents the unprotected DTV signal for the user. Transcoders 128 are particularly useful when an original population of receivers was deployed without decryption capability, thus requiring a nearby device (i.e., a transcoder 128) to adapt an encrypted broadcast DTV signal to the unencrypted format they can process.

Some embodiments of this invention could be used in a hybrid digital broadcast system where some content is protected and some is not. The digital receiver 126 would be used for the content that is protected, while a conventional receiver would be used for content that is not encrypted. The user could view the unprotected content with the conventional receiver, but would require a digital receiver 126 to view the protected content. Revocation of the right to use the digital receiver 126 would not affect the user's ability to view the unprotected content.

The digital tuner 132 could be integral or separate from the display. In this embodiment, the digital tuner 132 is integral with the display such that the program is protected until it reaches the television. The digital tuner receives the protected DTV signal and unscrambles it. Unscrambling includes decryption with a key available to provisioned digital receivers 126.

Figure 1B:
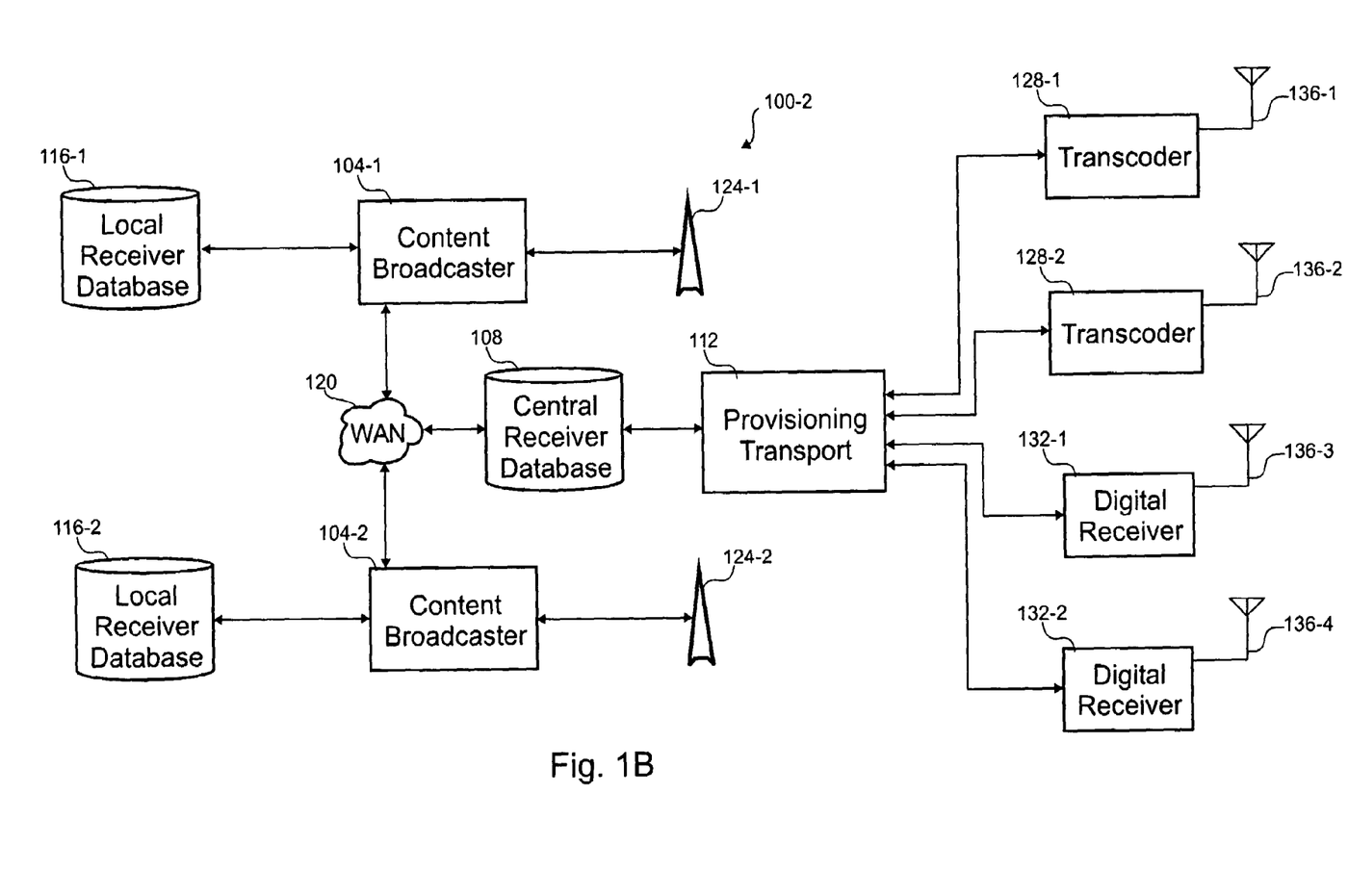
FIG. 1B is a block diagram of another embodiment of the terrestrial broadcast system that provisions centrally.

With reference to FIG. 1B, a block diagram of another embodiment of the terrestrial broadcast system 100-2 is shown that provisions digital receivers 126 centrally. In this embodiment, the digital receivers 126 are provisioned centrally by adding the unit key, certificate and unique serial number to the central receiver database 108. Based upon location information, the entry is propagated to the local receiver databases within likely transmission range of the digital receiver 126.

Figure 1C:
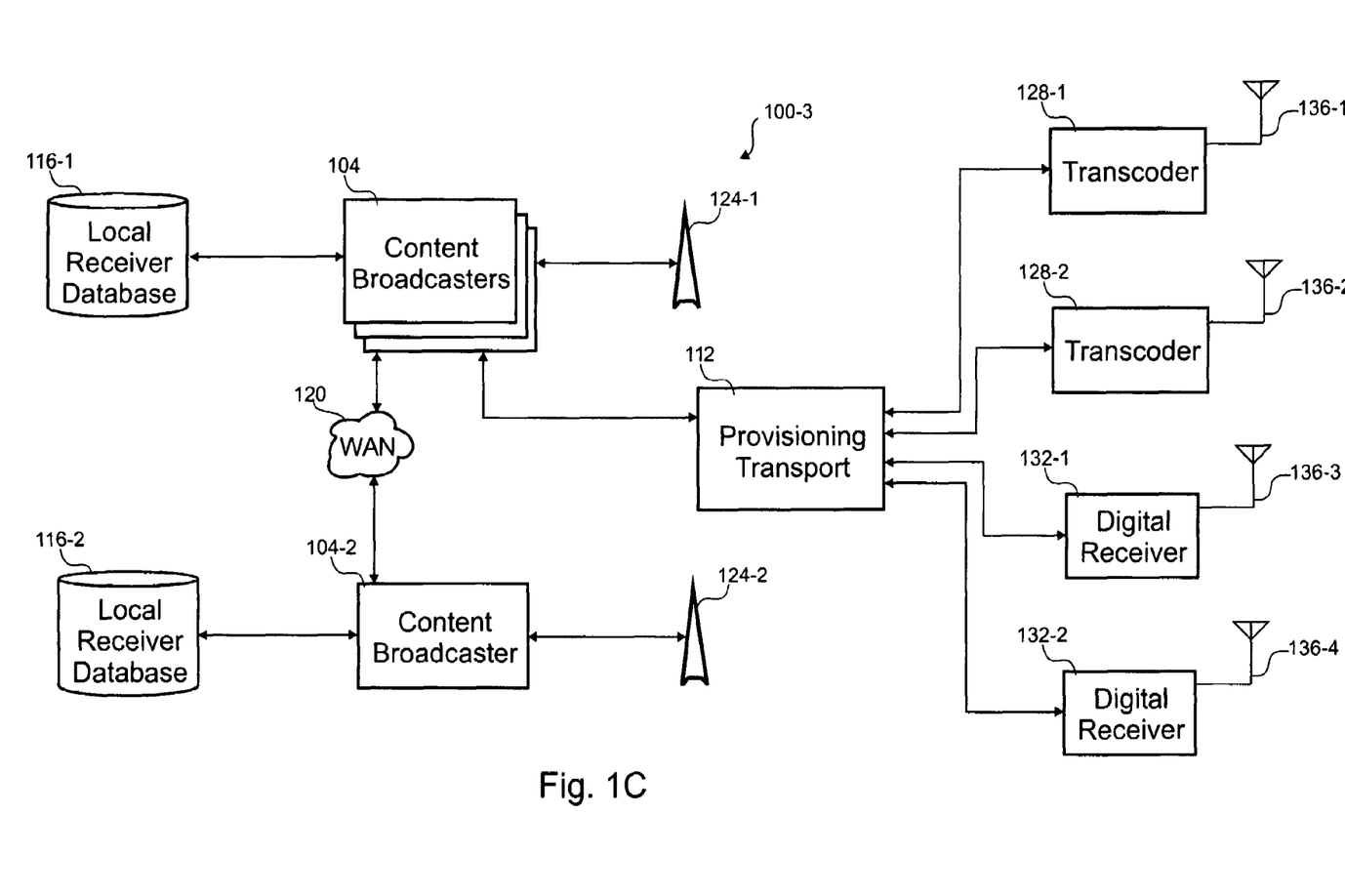
FIG. 1C is a block diagram of yet another embodiment of the terrestrial broadcast system that allows for sibling content broadcasters to share provisioning information.

Referring to FIG. 1C, a block diagram of yet another embodiment of the terrestrial broadcast system 100-3 that allows for sibling content broadcasters 104 to share provisioning information without the need for a central receiver database 108. The digital receivers 126 provision with a first content broadcaster 104-1. The entry added to the first local receiver database 116-1 is propagated to another local receiver database 116-2. Contact to geographically remote local receiver databases 116 could be performed periodically to determine those digital receivers 126 that have moved. In this embodiment, there are a number of content broadcasters 104 that share the first local receiver database 116-1. These content broadcasters 104 could share the same RMM or use a number of RMMs.

Figure 1D:
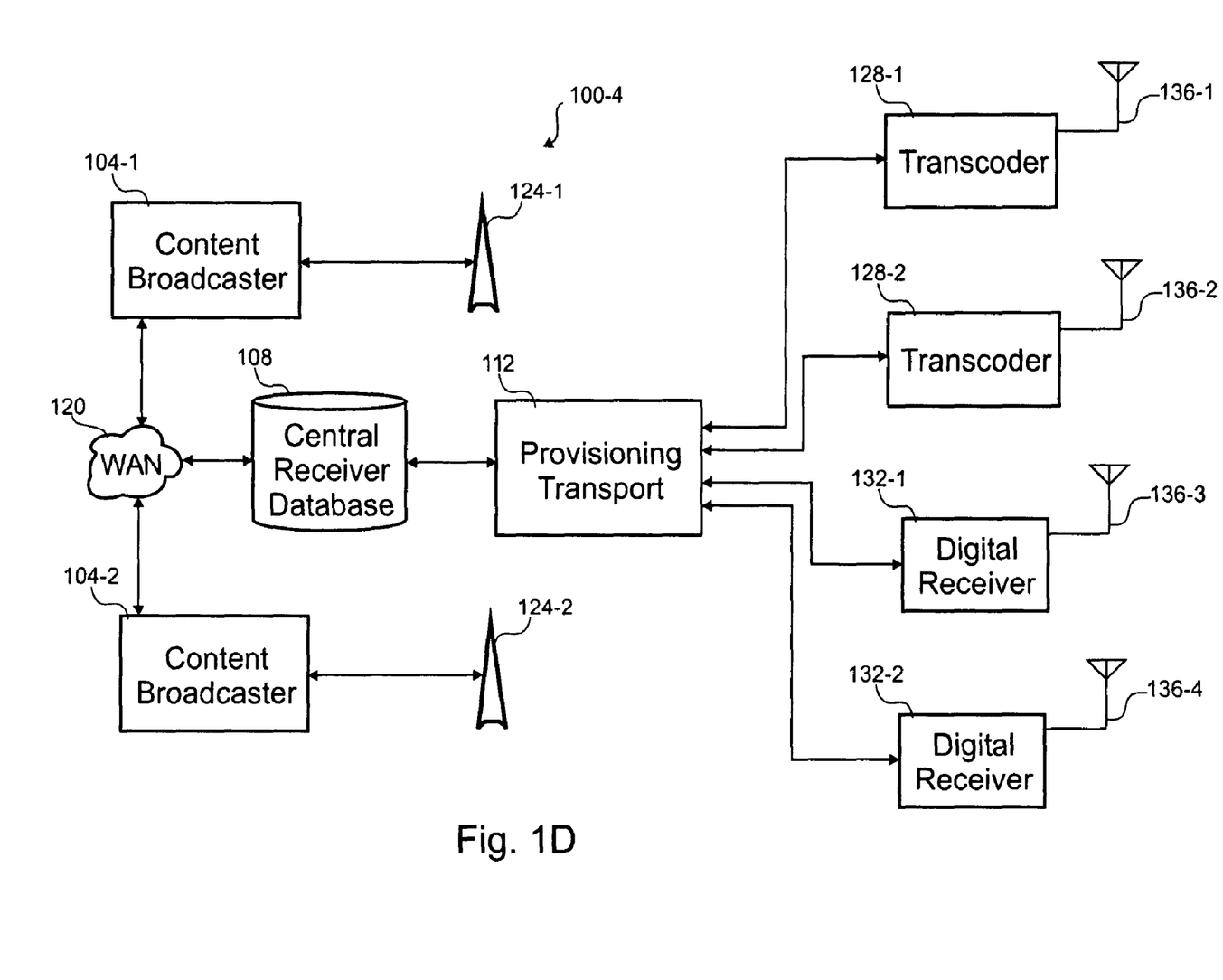
FIG. 1D is a block diagram of still another embodiment of the terrestrial broadcast system that provisions centrally without maintaining a central receiver database.

With reference to FIG. 1D, a block diagram of still another embodiment of the terrestrial broadcast system 100-4 is shown that provisions centrally without maintaining any local receiver databases 116. In this embodiment, the provisioning is done to update the central receiver database 108. Each entry in the central receiver database 108 can be geographically filtered by the content broadcasters 104. When determining the RMMs to send, the content broadcaster 104 queries the central receiver database 108 for the list of provisioned digital receivers 126 within probable broadcast range.

Figure 1E:
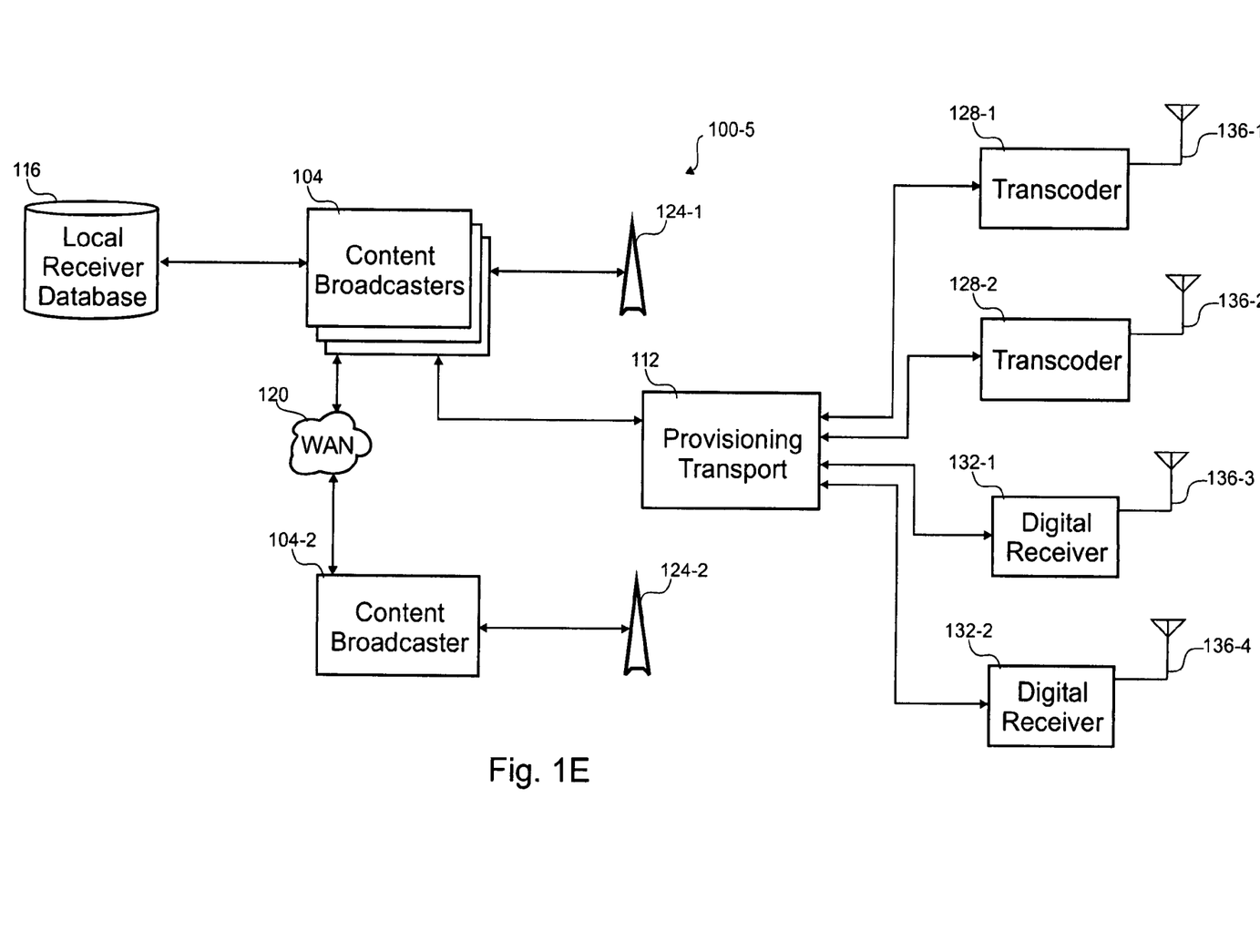
FIG. 1E is a block diagram of yet another embodiment of the terrestrial broadcast system that shares a local receiver database.

Referring next to FIG. 1E, a block diagram of yet another embodiment of the terrestrial broadcast system 100-5 is shown that shares a local receiver database 116 with many content broadcasters 104. In this embodiment, all the content broadcasters 104 use a local receiver database 116. All users who provision a digital receiver would contact a single entity for provisioning and that provisioning information is accessible to all content broadcasters 104. Some content broadcasters 104 directly connect with the receiver database 116 and others connect over a WAN 120. The content broadcasters 104 can use any number of category keys.

Figure 2A:
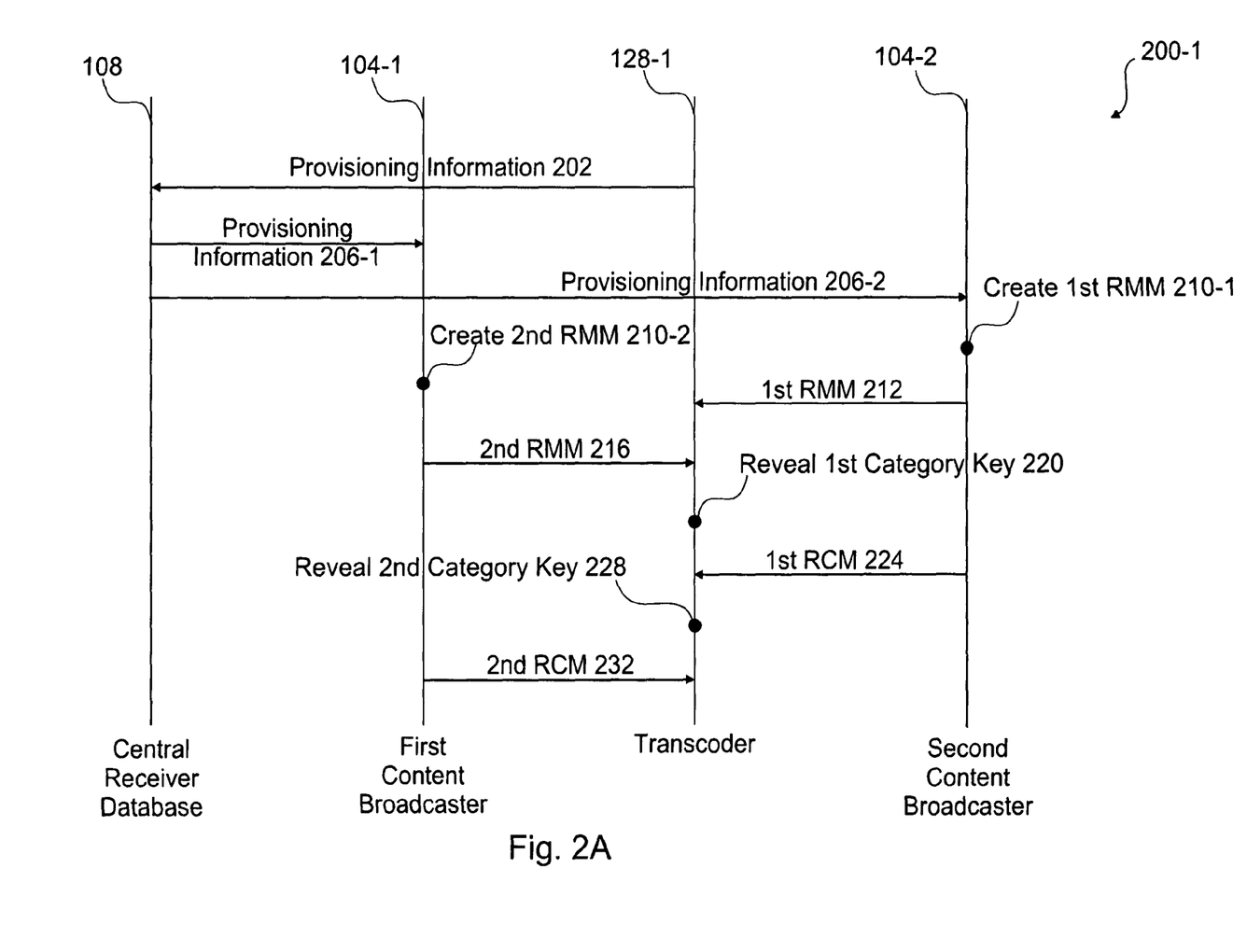
FIG. 2A is a protocol flow diagram of an embodiment of provisioning and key distribution process that uses central provisioning.

With reference to FIG. 2A, a protocol flow diagram of an embodiment of provisioning and key distribution process 200-1 is shown that uses central provisioning. The depicted portion of the flow begins in step 202 where the first transcoder 128-1 sends provisioning information to the central receiver database 108 by way of the provisioning transport 112. The certificate in the provisioning information could be validated to confirm authentication of the first transcoder 128-1. In steps 206-1 and 206-2, the provisioning information is sent to the first and second content broadcasters 104-1, 104-2 who are determined to be in likely broadcast range of the first transcoder 128-1. Additionally, the category key(s) could be delivered by the central receiver database 108 or the content broadcasters 104 could derive their own category key(s). In this embodiment, the first and second content broadcasters 104 use different category keys.

In steps 210-1 and 210-2, the unit key is taken from the provisioning information by each of the first and second content broadcasters 104-1, 104-2. An RMM is created by each content broadcaster 104. The RMM includes the category key for the content broadcaster 104 and is encrypted using the unit key for the transcoder 128-1. In this embodiment, the unit key is a public key and the category key is a private AES 128-bit key. The first RMM is sent from the second content broadcaster 104-2 in step 212 and the second RMM is sent from the first content broadcaster 104-1 in step 216.

In step 220, the RMM is decrypted by the transcoder 128-1 using the private version of the unit key to reveal the category key for the second content provider 104-2. In step 224, a first RCM is received along with a first program from the second content provider 104-2. Using the category key, the first RCM is decoded to reveal a first content key for the first program. Decrypting the program with the first content key allows producing an unprotected DTV signal for the display to process. The RMM for the first content provider 104-1 is received in step 216 and decoded to reveal another category key in step 228. In step 232, a second RCM and a second program are received from the first content provider 104-1 for transcoding with a second content key decoded from the second RCM.

In this embodiment there is a RCM for each program, but other embodiments are not so limited. For example, the RCM could designate a content broadcaster(s) 104 and a time frame. All programs from that content broadcaster 104 during that time frame would use the content key in the RCM. For example, the RCM could be valid for two hours, a day, a week, a month, a year, etc. A program may be protected by a first content key and then roll-over to the next content key during the program.

Figure 2B:
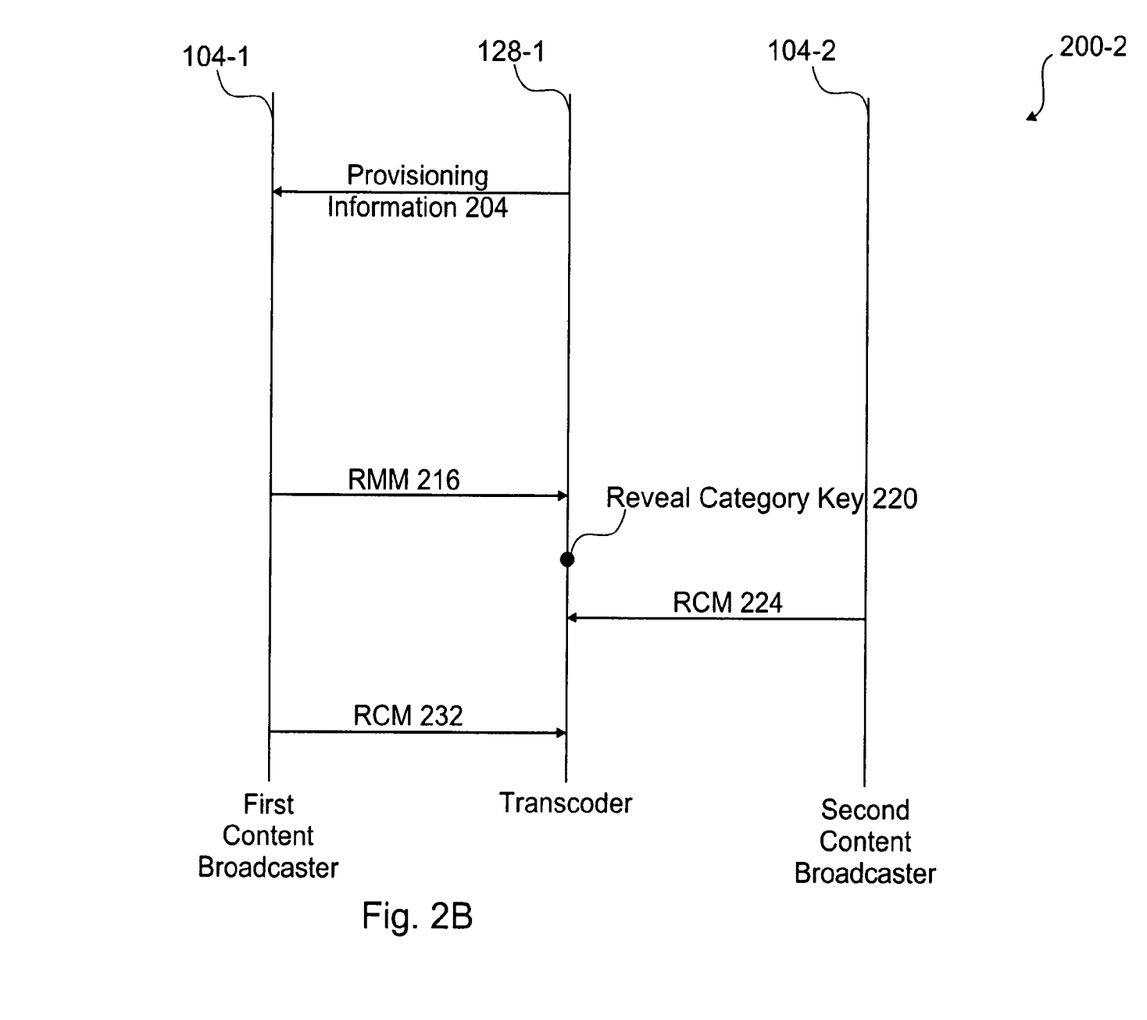
FIG. 2B is a protocol flow diagram of another embodiment of provisioning and key distribution process that allows sibling content broadcasters to share provisioning information.

Referring to FIG. 2B, a protocol flow diagram of another embodiment of provisioning and key distribution process 200-2 is shown that allows sibling content broadcasters to share provisioning information. Also, the first and second content broadcasters 104-1, 104-2 in this embodiment use the same category key and share a local receiver database 116. The transcoder 128-1 provisions with the first content broadcaster 104-1 in step 204 to add the provisioning information to the local receiver database 116. In step 216, the RMM is encrypted using the public unit key of the transcoder 128-1. The category key is retrieved from the RMM in step 220. RCMs and programs from both content broadcasters 104 are decoded in steps 224 and 232. The RCMs are unique to their respective program in this embodiment, but some embodiments could have the same RCM for more than one program.

This embodiment uses a single RMM for two content broadcasters 104, but a single RMM could provide a category key for any number of content broadcasters 104 and their RCMs. For example, one embodiment could include twenty content broadcasters 104 that use a single RMM. Another embodiment could use three RMMs to cover the same twenty content broadcasters. In yet another embodiment, twenty content broadcasters 104 could have fifty content services and use fifty RMMs such that there was one for each content service. Any permutation of RMMs and content services is possible in various embodiments.

Figure 2C:
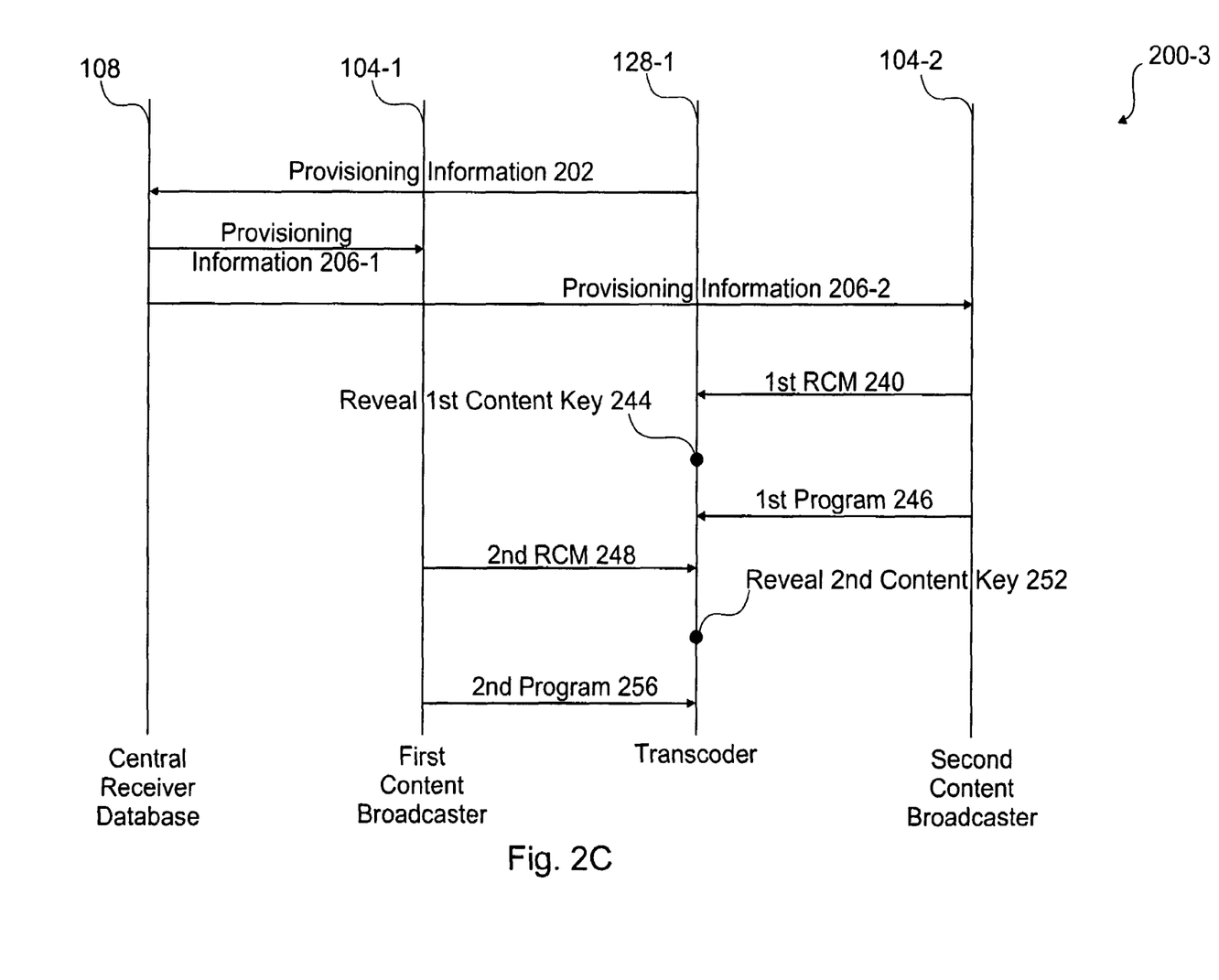
FIG. 2C is a protocol flow diagram of yet another embodiment of provisioning and key distribution process that sends content keys for a number of content broadcasters.

With reference to FIG. 2C, a protocol flow diagram 200-3 of yet another embodiment of provisioning and key distribution process is shown that sends content keys for a number of content broadcasters 104. This embodiment does not use a category key or RMM to deliver it. The RCM is uniquely encrypted for each receiver 126 with the unit key for that unit and sent from each content broadcaster in steps 240 and 248. Using the unit key, either symmetric or asymmetric decryption could be performed to derive the content key from the RCM in steps 244 or 252. In step 246, a first program is received from the second content broadcaster 104-1 for decryption with the first content key. The content key could be valid for a single program or a time period, for example, a number of hours, a day, a week, a year, etc.

In some embodiments, multiple content services are provided to the user by a content broadcaster 104. In other words, a given content broadcaster 104 may have one or more content services. From the user's perspective, a content service is a channel of video or audio programming or an on-demand video service. In the various embodiments, there may be any number of category or any number of content keys associated with a content broadcaster 104. For example, a content broadcaster 104 may offer thee services, but have only two different key schemes. Two of the services could have only a RCM for each service and not use an RMM, while another service could use both a RMM and RCM to enable the user to play the content service.

Figure 2D:
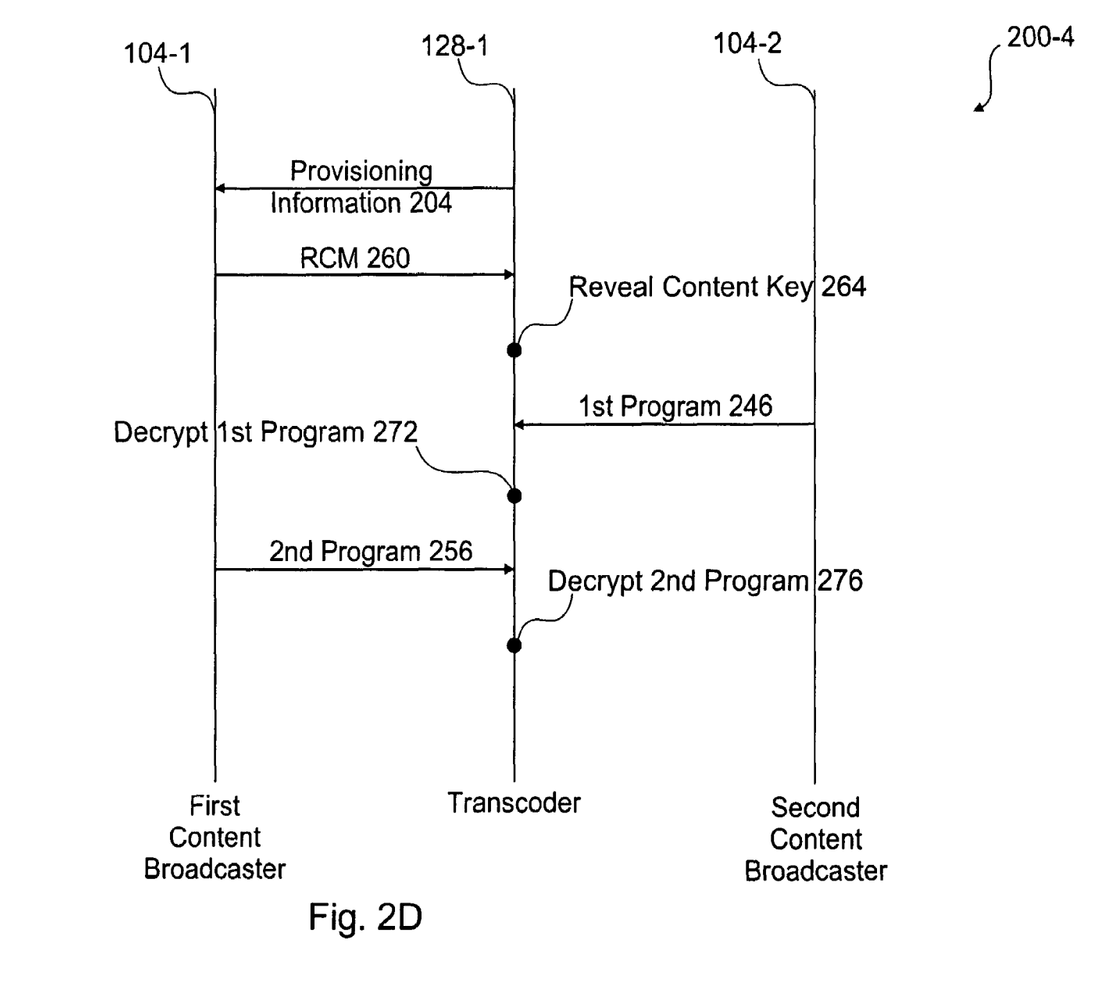
FIG. 2D is a protocol flow diagram of still another embodiment of provisioning and key distribution process that sends content keys for use with a number of content broadcasters.

Referring next to FIG. 2D, a protocol flow diagram 200-4 of still another embodiment of provisioning and key distribution process is shown that sends content keys for use with a number of content broadcasters 104. This embodiment does not use a RMM message, but uniquely encrypts the RCM message using the unit key for each receiver 126. The content key revealed from the RCM in step 264 is used to decrypt a first program from a second content broadcaster 104-2 in step 272 and decrypt a second program from a first content broadcaster 104-1 in step 276.

There are many variations on the number of content keys for a given implementation. The embodiment of FIG. 2C uses a content key for each content broadcaster 104. Some embodiments could have a number of content keys for the various services of a content broadcaster 104. With the embodiment of FIG. 2D, a content key is used for all content broadcasters 104, but other embodiments could use a content key for less than all content broadcasters 104. For example, there might be four content keys used among twenty content broadcasters. For embodiments that don't use a RMM, revocation of the right to use received program is performed by not sending a new RCM that is uniquely encrypted for the receiver 126. Once the old content key expires, a new RCM is not provided such that the right to use the content expires with the old content key.

The embodiments of FIGS. 2C and 2D do not use a RMM, but other embodiments could instead not have a RCM. The RMM is uniquely encrypted for the user and protects a category key. In this embodiment, that category key is used to decrypt programs from one or more content broadcasters 104 or services. Changing the category key without sending a RMM to a unit would revoke the right for that unit to use the content service(s) using the new category key.

Figure 3:
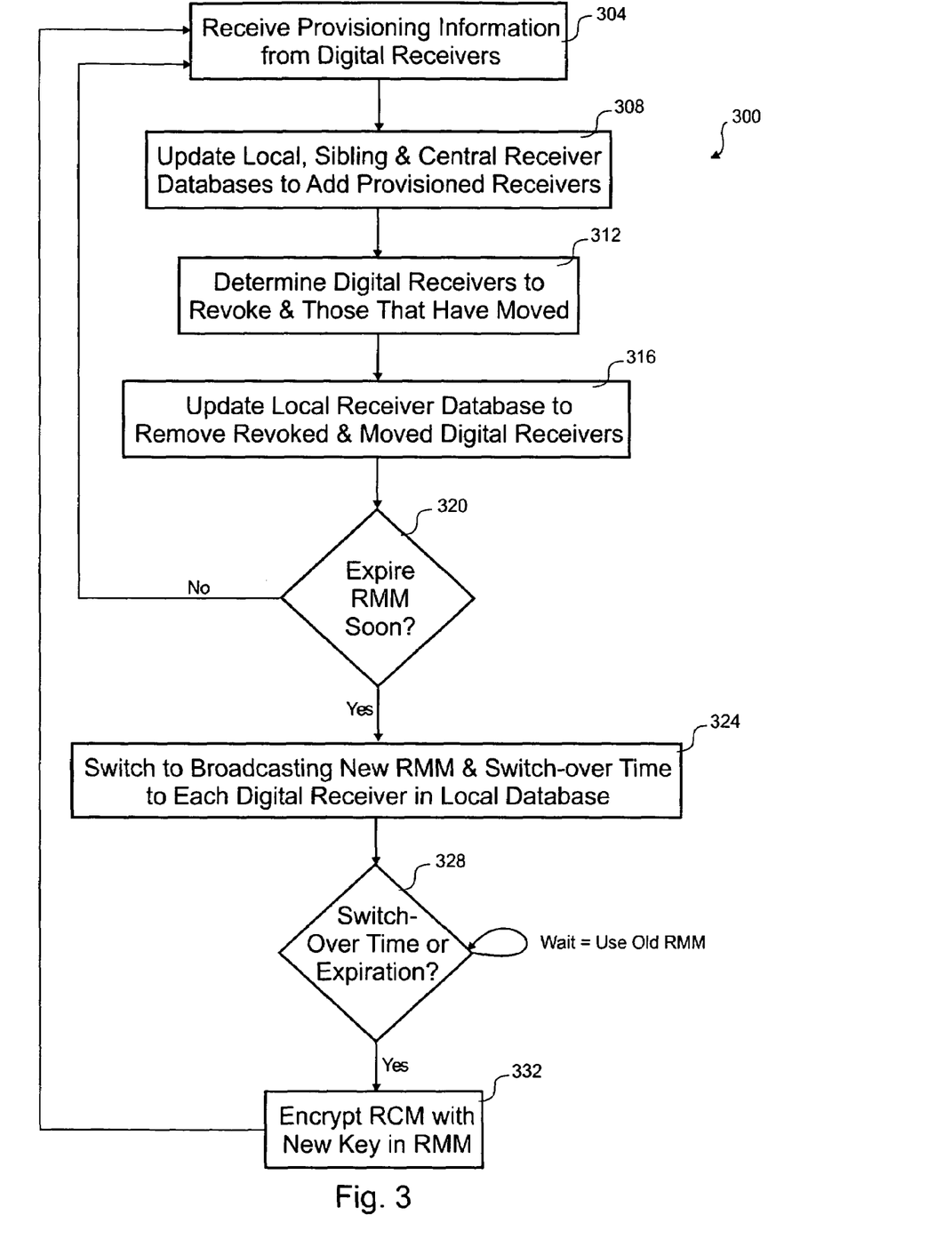
FIG. 3 is a flow diagram of an embodiment of a process for management of digital receivers in the terrestrial broadcast system.

With reference to FIG. 3, a flow diagram of an embodiment of a process 300 for management of digital receivers 126 in the terrestrial broadcast system 100 is shown. By changing the category key without providing some digital receivers 126 the new RMM, those digital receivers 126 can have their provisioning effectively revoked. This is a much more effective method than traditional distribution of Certificate Revocation Lists (CRLs), which can be blocked. The depicted portion of the process begins in step 304 where provisioning information is received from digital receivers 126. The local receiver database 116 is updated and the provisioning information is forwarded to other sibling local receiver databases 116 and any central receiver database 108 in step 308.

A determination is made in step 312 regarding those digital receivers 126 to deprovision because of revocation or a move away from the content broadcaster 104. Revocation could be performed when the user of a digital receiver 126 is adjudicated as a pirate or if unauthorized modifications to the digital receiver are detected, for example. The central receiver database 108 and sibling local receiver databases 116 can be used to determine which receivers 126 have moved or been revoked. The revoked and moved receivers are removed from the local receiver database in step 316. Only those entries remaining in the local receiver database 116 receive RMMs.

In step 320, it is determined if the RMM will soon expire. Where the RMM is still valid and not expiring soon, processing loops back to step 304. This embodiment sends the new RMM out three times before switching over to a new RCM that utilizes a different category key. It can take considerable time to send the RMM uniquely encrypted with a unit key for each digital receiver 126. The digital receiver may be given two category keys in a RMM such that the following RMM is also available when the preceding RMM expires. In step 324, the RMM with a switch-over time is broadcast to each digital receiver 126 in the local database 116. Step 324 could be performed in a loop on a given data channel such that the content broadcaster 104 continually cycles through the entries in the local database 116 to provide RMMs. Some embodiments could have multiple channels for distributing RMMs. Where two-way communication is available between the content broadcaster 104 and the digital receiver 126, the RMM could be sent a single time if receipt were acknowledged.

The switch-over time supercedes any expiration date for the old RMM. It may be necessary to switch-over to a new category key before it expires if the category key has been compromised. For example, a first RMM may expire in one year. Six months into that year, a second RMM could be distributed with a switch-over date of the following month. This will, in-effect, expire the first RMM in the seventh rather than the twelfth month.

In some cases, a digital receiver 126 could have missed some RMMs and not be able to decode protected DTV without the current category key. A query could be made either automatically or manually to the content broadcaster 104 to quickly broadcast the RMM for that receiver 126. With two-way communication the RMM could be singlecasted back to the receiver 126.

In step 328, RCMs are encrypted with the old category key until the switch-over time or expiration date. Once the old RMM and associated category key expires, the programs sent after that time use the new RMM's category key to encode their RCMs in step 332. Since the moved and revoked receivers 126 are not in the local database 116, they will not receive the new RMM and category key. Any programs sent after step 328 only utilize the new category key, and will be undecipherable to the moved and revoked receivers 126.

Figure 4:
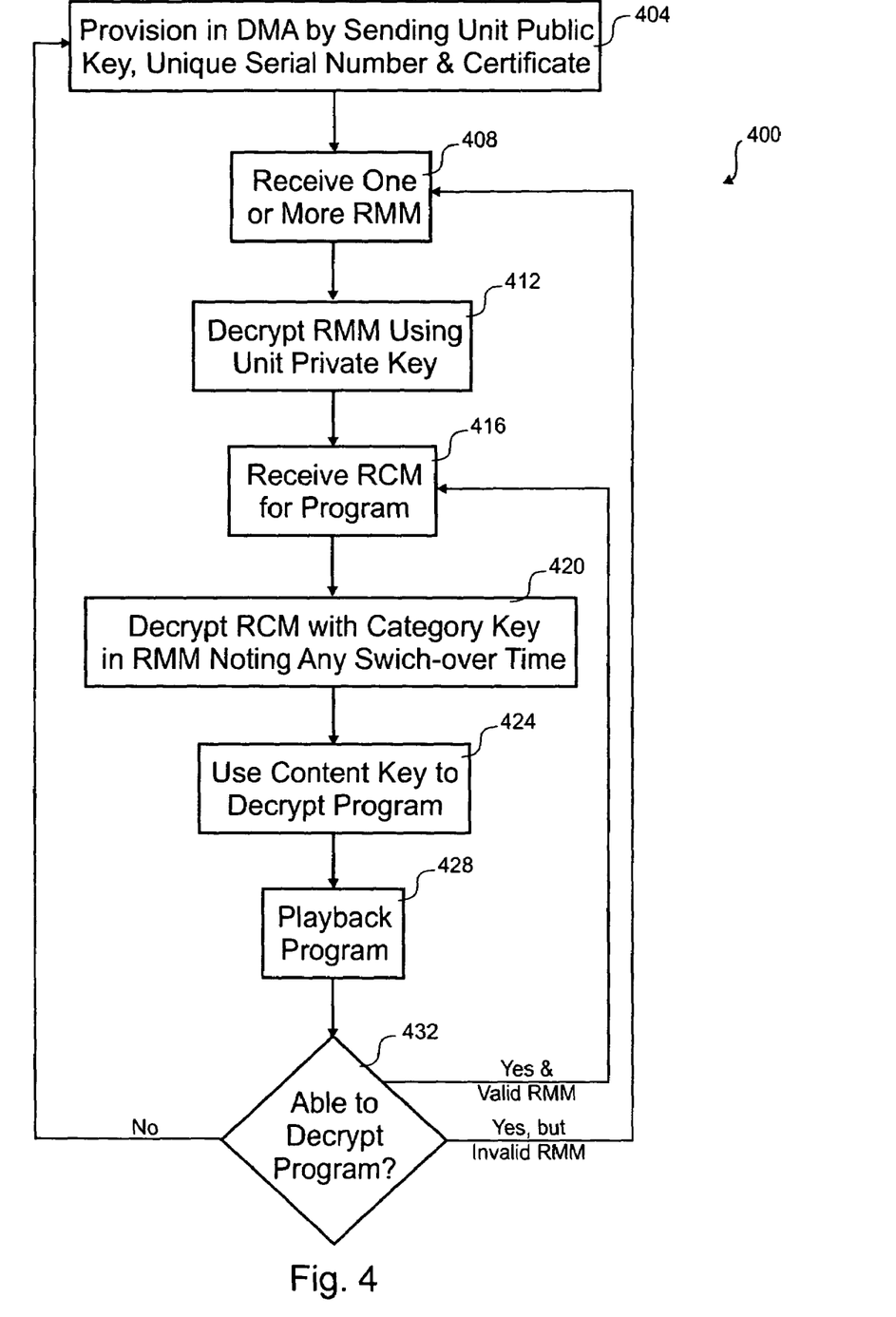
FIG. 4 is a flow diagram of an embodiment of a process for managing cryptographic functions with the digital receiver.

Referring to FIG. 4, a flow diagram of an embodiment of a process 400 for managing cryptographic functions with the digital receiver 126 is shown. The depicted portion of the process 400 begins in step 404 where the digital receiver 126 provisions in the DMA by sending provisioning information. In this embodiment, the provisioning information includes a unit key, unique serial number and certificate. Some embodiments could use a unit key or unique serial number and forgo authentication with a certificate.

A RMM is received in step 408 from a digital data stream. The data stream could be on a special content channel, a control/data channel, or some other data channel. The RMM is decrypted in step 412 using the private unit key resident in the digital receiver 126. A header on the RMM indicates the unique serial number of the digital receiver 126. Decryption of the RMM reveals the currently valid category key. Information in the RMM indicates what channels and/or PIDs correspond to the category key. There could be any number of category keys for the various channels and/or PIDs.

To tune in a protected channel, the carrier signal is decoded for that channel. The program is identified with a PID in the decoded data stream. An RCM is received from the data stream for that program in step 416. The RCM is decrypted with the current category key to reveal the content key. In step 424, the content key is used to decrypt the program, which is displayed in step 428.

Where it is determined the program was not unscrambled properly because of a bad RMM and category key, processing loops back to step 404 for reprovisioning. If the RMM is not invalid after watching the program, processing loops back to step 416 to watch additional programs. If the RMM expires or switches over during viewing of the program, processing loops back to step 408 to receive a new RMM and valid category key. In many cases, the RMM for the next time period is already available such that acquisition is unnecessary. Other embodiments could be constantly watching a RMM channel to receive any RMM addressed to a specific receiver 126.

A number of variations and modifications of the invention can also be used. For example, instead of assigning a unit key to each digital receiver 126 during manufacture, this key could be assigned during the provisioning process. Various embodiments could distribute RMM and RCM in any number of ways such as broadcast, multicast, singlecast, etc.

While the principles of the invention have been described above in connection with specific apparatuses and methods, it is to be clearly understood that this description is made only by way of example and not as limitation on the scope of the invention.

What is claimed is:

1. A method for protecting digital television from unauthorized digital receivers within a population of digital receivers, where each digital receiver in the population has a unique identifier, the method comprising steps of:
   at a broadcaster:
      receiving provisioning information from a subset of the population of digital receivers indicating that the subset is potentially within range to receive digital television from the broadcaster, the provisioning information including a unique serial number associated with each digital receiver;
      distributing first decryption information to the subset of the population of digital receivers, wherein:
         the first decryption information allows for potentially decrypting a plurality of programs coextensively in time, and
         the unauthorized digital receivers are cryptographically excluded from using the first decryption information;
      encrypting first content using a first method using a content encryption key;
      distributing the first content;
      encrypting the content encryption key using the first decryption information, the first decryption information being generated using the provisioning information; and
      distributing the content encryption key to the subset of the population of digital receivers using a second decryption information, wherein the second decryption information is cryptographically secured with the first decryption information.

2. The method for protecting digital television from unauthorized digital receivers within the population of digital receivers, where each digital receiver in the population has the unique identifier as recited in claim 1, further comprising steps of:
   encrypting second content using a second method that is cryptographically related to third decryption information, wherein at least one of an algorithm, a key and a key length of the second method is different from that of the first method;
   sending the second content; and
   distributing third decryption information to the subset of the population of digital receivers, wherein the second decryption information is cryptographically secured with the first decryption information.

3. The method for protecting digital television from unauthorized digital receivers within the population of digital receivers, where each digital receiver in the population has the unique identifier as recited in claim 1, further comprising a step of uniquely encrypting the first decryption information for each of the subset, wherein the first-listed distributing step comprises sending first description information uniquely encrypted for each of the subset.

4. The method for protecting digital television from unauthorized digital receivers within the population of digital receivers, where each digital receiver in the population has the unique identifier as recited in claim 1, further comprising a step of determining the unauthorized digital receivers to exclude from the subset of the population of digital receivers.

5. The method for protecting digital television from unauthorized digital receivers within the population of digital receivers, where each digital receiver in the population has the unique identifier as recited in claim 1, wherein the first decryption information is uniquely encrypted for each of the subset.

6. The method for protecting digital television from unauthorized digital receivers within the population of digital receivers, where each digital receiver in the population has the unique identifier as recited in claim 1, wherein the first decryption information comprises a key for decrypting the second decryption information.

7. The method for protecting digital television from unauthorized digital receivers within the population of digital receivers, where each digital receiver in the population has the unique identifier as recited in claim 1, wherein the first decryption information expires by changing keys, key lengths and/or algorithms used to encrypt the first content.

8. The method for protecting digital television from unauthorized digital receivers within the population of digital receivers, where each digital receiver in the population has the unique identifier as recited in claim 1, further comprising a step of forwarding the provisioning information to another broadcaster within range of one of the subset.

9. The method for protecting digital television from unauthorized digital receivers within the population of digital receivers, where each digital receiver in the population has the unique identifier as recited in claim 1, wherein the unique identifier includes a key.

10. A computer system adapted to perform the computer-implementable method for protecting digital television from unauthorized digital receivers within the population of digital receivers of claim 1.

11. A method for processing digital television within a population of digital receivers, where each digital receiver in the population has a unique identifier, the method comprising steps of:
   at a subset of the population of digital receivers:
      sending provisioning information from the subset of the population of digital receivers indicating that the subset is within range to receive digital television from a broadcaster, the provisioning information including a unique serial number associated with each digital receiver;

receiving first decryption information by the subset of the population of digital receivers, wherein:

the first decryption information allows for potentially decrypting a plurality of programs coextensively in time, and the unauthorized digital receivers are cryptographically excluded from using the first decryption information;

receiving first content;

receiving content encryption information from the broadcaster, wherein the content encryption information is encrypted using the first decryption information; and decrypting the first content using the content encryption information, wherein the first decryption information is based on the provisioning information, receiving second decryption information from a place remote to the content receiver, wherein the second decryption information is encrypted using the first decryption information.

12. The method for processing digital television within the population of digital receivers, where each digital receiver in the population has the unique identifier as recited in claim 11, further comprising steps of:

receiving second content;

receiving third decryption information from the broadcaster, wherein the third decryption information is cryptographically secured with the first decryption information; and decrypting the second content using a second method that is cryptographically related to the third decryption information, wherein at least one of an algorithm, a key and a key length of the second method is different from that of the first method.

13. The method for processing digital television within the population of digital receivers, where each digital receiver in the population has the unique identifier as recited in claim 11, wherein the first decryption information is uniquely encrypted for each of the subset.

14. The method for processing digital television within the population of digital receivers, where each digital receiver in the population has the unique identifier as recited in claim 11, wherein the unique identifier includes a key.

15. A computer system adapted to perform the computer-implementable method for processing digital television within the population of digital receivers of claim 11.

* * * * *